United States Patent [19]

Funamoto

[11] Patent Number: 4,794,047
[45] Date of Patent: Dec. 27, 1988

[54] METHOD OF MANUFACTURING MAGNETIC RECORDING MEDIUM

[75] Inventor: Susumu Funamoto, Odawara, Japan
[73] Assignee: Hitachi, Ltd., Tokyo, Japan
[21] Appl. No.: 75,524
[22] Filed: Jul. 20, 1987

[30] Foreign Application Priority Data

Jul. 21, 1986 [JP] Japan ............................ 61-169911

[51] Int. Cl.⁴ .......................... G11B 5/64; G11B 5/72
[52] U.S. Cl. ............................ 428/408; 204/192.11; 204/192.16; 204/192.2; 427/128; 427/132; 428/611; 428/652; 428/667; 428/678; 428/694; 428/695; 428/900; 428/928
[58] Field of Search ............... 428/694, 900, 928, 408, 428/695, 611, 678, 652, 667; 204/35.1, 192.11, 192.2, 192.16; 427/128–132; 360/134–136

[56] References Cited

U.S. PATENT DOCUMENTS

| | | |
|---|---|---|
| 4,202,932 | 5/1980 | Chen et al. ........................ 427/128 |
| 4,540,600 | 9/1985 | Kobayashi et al. ............... 427/130 |
| 4,557,944 | 12/1985 | Arai et al. ........................ 427/130 |
| 4,673,610 | 6/1987 | Shirahata et al. ................ 428/213 |
| 4,675,239 | 6/1987 | Sakurai et al. ................... 428/607 |

Primary Examiner—Ellis P. Robinson
Attorney, Agent, or Firm—Antonelli, Terry & Wands

[57] ABSTRACT

The method of manufacturing a magnetic recording medium according to the present invention comprises a first step in which a ferromagnetic metal layer of a predetermined thickness is formed on a substrate, and a second step contiguous to said first step and in which another ferromagnetic metal layer is formed by applying a bias voltage to the substrate. Since the ferromagnetic metal layer formed at the second step is excellent in corrosion resistance, even if a protective layer such as a carbon layer incurs a pit defect when the medium is being produced or even when the protective layer is separated, the ferromagnetic metal layer in consideration will not be corroded, thus preventing any error from occurring in data recording or reproduction.

11 Claims, 1 Drawing Sheet

METHOD OF MANUFACTURING MAGNETIC RECORDING MEDIUM

BACKGROUND OF THE INVENTION (a) Field of the Invention

The present invention relates to a method of manufacturing a magnetic recording medium and, more specifically, to a method of manufacturing a magnetic recording medium which is optimally employable for the improvement of the corrosion resistance of a magnetic recording medium made of a ferromagnetic metal layer.

(b) Prior Art Statement

For improving the recording density of conventional magnetic recording media, great efforts have been made to improve the properties of the media themselves and to reduce the thickness thereof. Similarly for the improved recording density of the magnetic recording media, it has been proposed to reduce the spacing between the magnetic recording medium and recording-/reproduction head. Among others, a magnetic recording medium is known which uses a ferromagnetic metal layer formed by sputtering and evaporation and which has excellent properties and reduced thickness. For maintaining the performance as a recording medium, however, these magnetic recording media need a protective layer, lubricating layer or both to improve the corrosion resistance and sliding resistance.

The aforementioned magnetic recording media having protective and lubricating layers for improved reliability are disclosed in, for exapple, Japanese Unexamined Patent Publication Nos. 57-18028, 56-114131 and 57-138054.

As described in the foregoing, the conventional magnetic recording media require a protective layer to improve the corrosion resistance of the ferromagnetic metal layer; in the conventional techniques of manufacturing the magneiic recording media, however, no consideration has been given to the adhesion between the ferromagnetic metal layer and protective layer and the consistency of the manufacturing process. More particularly, since the protective layer is generally formed with quite a different material from that of the ferromagnetic metal layer, the adhesion between them is insufficient so that the protective layer is apt to be separated as the case may be. Thus, the ferromagnetic metal layer is corroded so that the performance of the magnetic recording medium cannot be maintained and also its reliability is low.

Furthermore, since the ferromagnetic metal layer and protective layer are formed in different processes, respectively, no consistency can be ensured between the forming process and equipment. Thus, the forming process and equipment are complicated, resulting in a reduced manufacturing efficiency.

SUMMARY OF THE INVENTION

The present invention seeks to overcome the above-mentioned drawbacks of the conventional techniques by providing a method of manufacturing a highly corrosion-resistant magnetic recording medium by means of a simplified forming process and equipment.

According to another aspect of the present invention, a method of manufacturing a magnetic recording medium, whereby a part of the ferromagnetic metal layer as an information carrying surface can be formed as a protective layer superior in corrosion reiistance.

The above objects can be attained by providing a method of manufacturing a magnetic recording medium, comprising a step of forming a ferromagnetic metal layer on a substrate by sputtering, evaporation or the like, more particularly, forming a ferromagnetic metal layer to a predetermined thickness on the substrate and then forming another ferromagnetic metal layer by applying a bias voltage to the substrate.

According to the present invention, in case a ferromagnetic metal layer is formed by sptttering, evaporation or the like, it is made to a necessary thickness for a recording medium and then another ferromagnetic metal film is formed following the surfacial layer by applying a bias voltage to the substrate.

Since during the formation of a ferromagnetic metal layer by applying the bias voltage to the substrate, various impacts are applied to the layer surface, the layer thus formed is a fine one denatured to some extent as compared with a ferromagnetic metal layer formed without applying any bias voltage. The experiments proved that the layer formed by applying a bias voltage is very difficult to be corroded. Namely, this film provides an effective corrosion-resistant protective layer.

In the recording medium formed by the method according to the present invention, the ferromagnetic recording medium itself also functions as a protective layer, and since both the ferromagnetic metal layers are continuously formed without any time interval from one to another in the same equipment, there occurs no reduction of the adhesion between the layers due to any staining on the layers or to creation of any boundary between the layers.

These and other objects and advantages of the present invention will be better understood from the ensuing description made by way of example of the embodiment according to the present invention with reference to the drawings.

DETAILED DESCRIPTION OF THE PREFERRED EMBODIMENT

Figure 1:
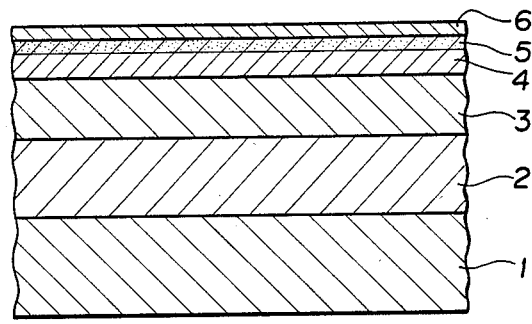
FIG. 1 is a schematic sectional view of the magnetic disk formed by the method of manufacturing a magnetic recording medium according to the present invention.

FIG. 1 is a sectional view showing an example of a magnetic disk manufactured by the method of manufacturing a magnetic recording medium according to the present invention. In this Figure, the reference numeral 1 indicates an aluminum-alloy substrate, 2 a NiP-plated primary layer, 3 a Cr-sputtered primary layer, 4 and 5 ferromagnetic metal layers, respectively, formed by the method according to the present invention. The ferromagnetic metal layer 5 is superior in corrosion resistance as will be described later. The numeral 6 indicates a carbon-sputtered layer which improves the resistance and lubrication of the magnetic disk.

Figure 2:
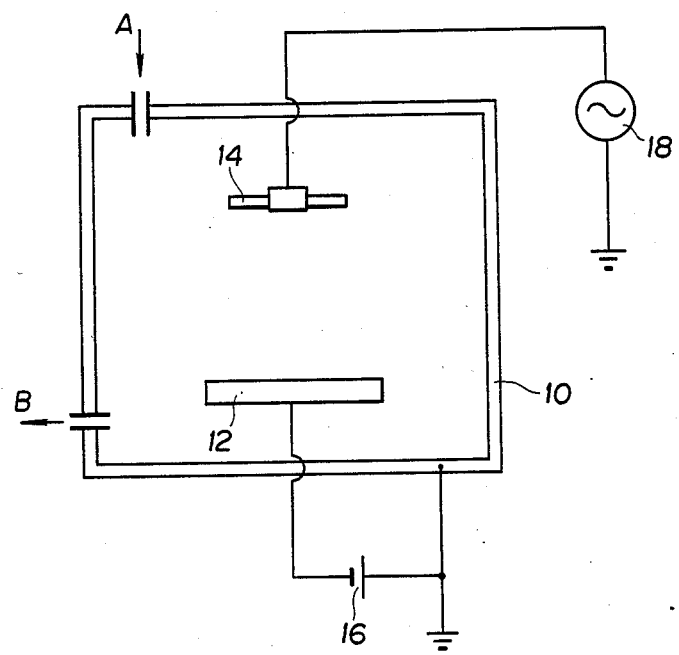
FIG. 2 is a schematic diagram of an equipmment implementing the method of manufacturing a magnetic recording medium according to the present invention.

The method of manufacturing a magnetic disk of which the construction is shown in FIG. 1 will be explained with reference to FIG. 2. The process of applying the NiP-plated primary layer 2 onto the aluminum-alloy substrate 1 and further the Cr-sputtered primary layer 3 onto the NiP-plated primary layer 2 is similar to that of the conventional techniques.

The ferromagnetic metal layers 4 and 5 are applied onto the Cr-sputtered primary layer 3 in the following process. That is, the ferromagnetic metal layers 4 and 5 are formed on the Cr-sputtered primary layer 3 by sputtering basically a Co alloy such as Co-Ni, Co-Ni-Cr or the like. This process will be described in more detail below. There are disposed within a chamber 10 a Co-alloy target 12 and a disk 14 on the alluminum-alloy substrate 1 of which the NiP-plated primary layer 2 and Cr-sputtered primary layer 3 are formed, the target 12 and disk 14 being separated 70 mm from each other. The target 12 is 8 inches in diameter, while the diameter of the disk 14 is 5 inches. The sputtering system adopted in this embodiment is one using a planar magnetron. In an actual system, a sputtering coil (not shown) is disposed below the target 12. The chamber 10 is supplied with an Ar gas from the direction of arrow A, and exhausted in the direction of arrow B. Thus, the interior of the chamber 10 is kept at a vacuum of $2 \times 10^{-2}$ Torr. The target 12 is connected to a DC power supply and applied with a negative DC voltage. The disk 14 is arranged by means of a holder (not shown) inside the chamber 10, and the aluminum-alloy substrate 1 is connected to a high frequency power supply 18 of 13.56 kHz in power frequency and thus applied with a high-frequency power.

The sputtering is started first with the DC power supply 16 electrically connected to the target 12. In this embodiment, the target 12 is applied with a DC power of 1.2 kW, and the sputtering is done for about 30 sec to form a ferromagnetic metal layer 4 of approximately 600 Å. Furthermore, a high-frequency power of 200W is applied to the aluminum-alloy substrate 1 of the disk 14 for about 10 sec with the DC power supply 16 electrically connected to the target 12, whereby a ferromagnetic metal layer 5 of about 50 Å is formed on the above-mentioned ferromagnetic metal layer 4. The experiments showed that the ferromagnetic metal layer 5 formed while applying a high-frequency bias voltage to the disk 14 is superior in corrosion resistance, and that the ferromagnetic metal layer 4 formed with no high-frequency bias voltage applied to the disk 14 is dissolved in an $HNO_3$ solution of 25% in volume while the layer 5 cannot be dissolved in the solution after being dipped for 10 min.

A carbon layer indicated at the numeral 6 is formed on the ferromagnetic metal layer 5 by sputtering using another carbon target as target 12 after stopping the supply of the high-frequency power to the aluminum-alloy substrate 1.

Since the surface of the ferromagnetic metal layer as the recording medium of the magnetic disk formed by the method according to the present invention is excellent in corrosion resistance, even if a pit defect is created when the carbon-sputtered layer 6 is formed, the ferromagnetic metal layer 5 will not be corroded when in contact with $H_2O$ or $Cl_2$ in the atmosphere. Therefore, no error will be caused in recording/reproduction of data by the corrosion of the recording medium. Even if the carbon-sputtered layer 6 is ground or separated due to the contact of the magnetic head with the carbon-sputtered layer 6, the ferromagnetic metal layer 5 will act as a corrosion-resistant protective layer, so that no error will occur in recording or reproduction of any data. In addition, since the ferromagnetic metal layers 4 and 5 are formed continuously with the same material, there exists no inter-layer boundary between the layers (in the illustration, the boundary is shown for the convenience of explanation), and they are bonded to each other with a strength as in metal bonding. Therefore, these layers will not be separated from each other even if they are in contact with the magnetic head.

The magnetic disk manufactured by the method according to the present invention is highly reliable in that no error will occur in data recording or reproduction even when a corrosion is found in the ferromagnetic metal layer.

In the embodiment described in the foregoing, a high-frequency power is applied to the aluminum-alloy substrate 1. However, the present invention is not limited only to this embodiment, but it is possible to form a fine, highly corrosion-resistant ferromagnetic layer by controlling the metal molecules flying from the target through application of a bias voltage like a negative voltage or the like.

What is claimed is:

1. A method of manufacturing a magnetic recording medium, comprising a step of forming on a substrate a ferromagnetic metal layer containing Co metal or Co-alloy by sputtering or evaporation, said step comprising:
    a first process in which said ferromagnetic metal layer is formed on said substrate to a predetermined thickness without applying a bias voltage to said substrate, and
    a second process contiguous to said first process and in which another ferromagnetic metal layer is formed by applying a bias voltage to said substrate.

2. A method according to claim 2, wherein said second process comprising a step in which the biasing is done by applying a high-frequency power to said substrate.

3. A magnetic recording medium manufactured by the method according to claim 1.

4. A magnetic recording medium manufactured by the method according to claim 2.

5. A method according to claim 1, wherein said ferromagnetic metal layer formed by said first process and said another ferromagnetic metal layer formed by said second process have the same composition.

6. A method according to claim 2, wherein said high frequency power is about 200W.

7. A method according to claim 1, wherein each of said first process and said second process is a sputtering process.

8. A method according to claim 1, wherein said substrate comprises an aluminum-alloy having a NiP layer provided thereon and a Cr layer provided on said NiP layer, and wherein said ferromagnetic metal layer is provided on said Cr layer.

9. A method according to claim 8, further comprising forming a carbon layer over said another ferromagnetic metal layer.

10. A method according to claim 1, wherein said bias voltage is applied to said substrate so as to form said another ferromagnetic metal layer with corrosion resistance superior to said ferromagnetic metal layer formed by said first process.

11. A magnetic recording medium manufactured by the method according to claim 10.

* * * * *